United States Patent [19]

Harlan

[11] 4,158,852

[45] Jun. 19, 1979

[54] VIDEO SIGNAL TRANSLATING CIRCUIT

[75] Inventor: Wayne E. Harlan, Indianapolis, Ind.

[73] Assignee: RCA Corporation, New York, N.Y.

[21] Appl. No.: 904,777

[22] Filed: May 11, 1978

[51] Int. Cl.² .......... H04N 9/535

[52] U.S. Cl. .......... 358/35; 358/39; 358/37

[58] Field of Search .......... 358/39, 37, 35, 38, 358/166

[56] References Cited

U.S. PATENT DOCUMENTS

| | | | |
|---|---|---|---|
| 3,849,792 | 11/1974 | Holzrichter | 358/37 |
| 3,859,544 | 1/1975 | Nero | 358/35 |
| 3,935,384 | 1/1976 | Jirka | 358/166 |
| 4,021,848 | 5/1977 | Srivastava et al. | 358/162 |

*Primary Examiner*—Richard Murray

*Attorney, Agent, or Firm*—Eugene M. Whitacre; William H. Meagher

[57] ABSTRACT

In a color television receiver luminance channel, transistor amplifier stage develops respective versions of input video signals across load resistors in collector and emitter circuits. Capacitor links collector to stage's output terminal, and parallel combination of inductor and resistor links emitter to output terminal. Parameter values are chosen to cause stage to provide delay-versus-frequency characteristic compensatory for delay distortion introduced by receiver's IF amplifier. Use of variable resistor as collector load resistor provides facility for adjustable peaking of luminance channel's amplitude-versus-frequency characteristic while maintaining delay distortion compensation effect.

8 Claims, 6 Drawing Figures

TUNER 10
IF AMPLIF. 20
VIDEO DETECTOR 30
LUMINANCE CHANNEL 40
DELAY LINE DRIVER 41
DELAY LINE 42
GAIN CONTROL STAGE 43
+27V.
44 45 46 47 48 49
I O
VIDEO AMPLIF. 50
CHROMINANCE CHANNEL 70
KINE DRIVER 61
KINE DRIVER 63
KINE DRIVER 65
R G B

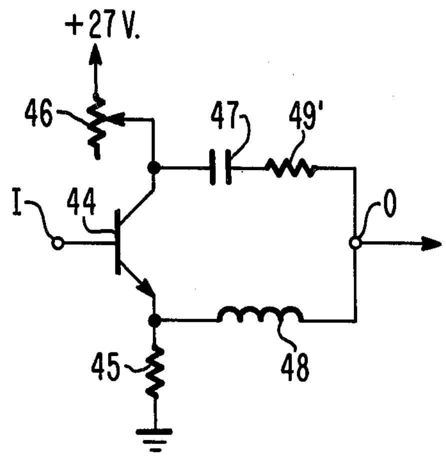
Fig. 2.
Fig. 3.
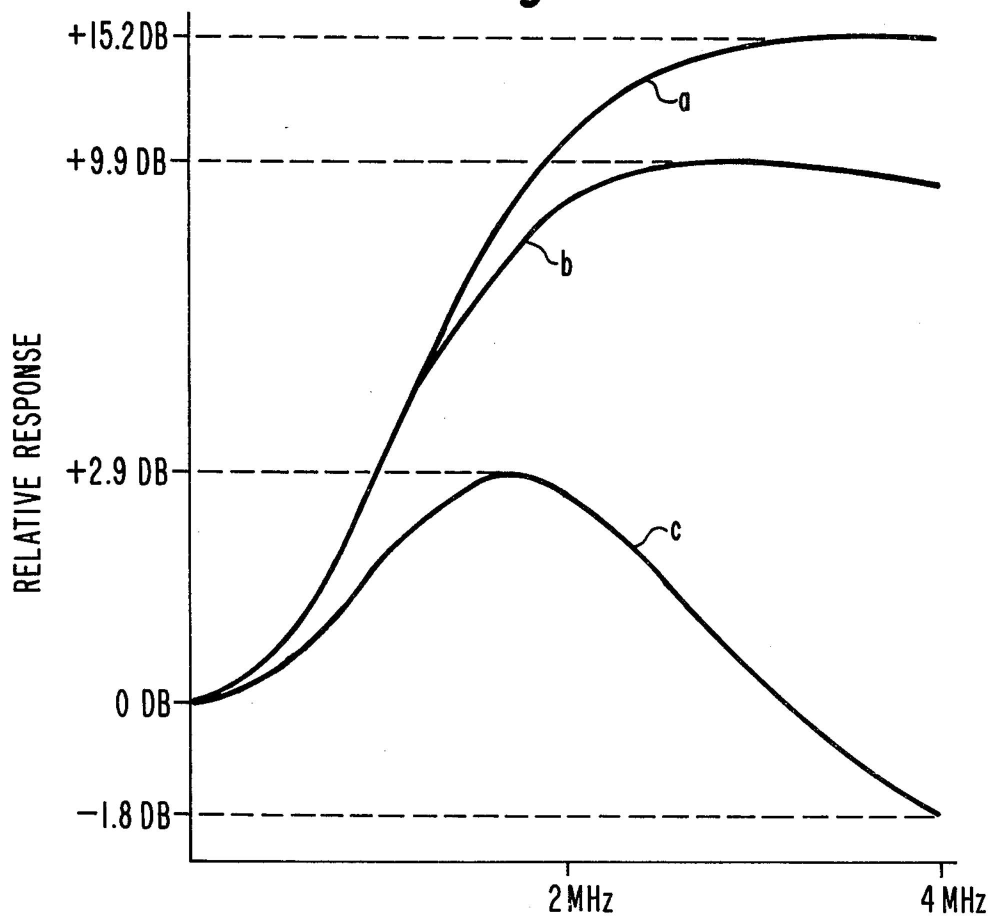

supply terminal (+27 V.); the other fixed end terminal of potentiometer 46 is unconnected. The potentiometer's adjustable tap is connected to the collector electrode of transistor 44. A capacitor 47 is connected between the collector electrode of transistor 44 and the output terminal O, while the parallel combination of a coil 48 and a resistor 49 is coupled between the emitter electrode of transistor 44 and the output terminal O.

Illustrative values for the illustrated circuit components are: resistor 45—360 ohms; potentiometer 46—2,000 ohms; capacitor 47—47 micromicrofarads; coil 48—150 microhenries; resistor 49—1,300 ohms. The network formed by components 47, 48 and 49 exhibits resonance at a frequency lying in an intermediate portion of the range of frequencies occupied by the luminance signal. With the illustrative component values given above, the resonant frequency falls at approximately 1.89 MHz. FIG. **4*a* illustrates the resultant delay-versus-frequency characteristic of the video signal translating stage obtained in use of these component value choices, when the collector load resistor provided by potentiometer 46 is at its maximum resistance value setting (2,000 ohms). As there illustrated, the delay rises with frequency from a low frequency minimum to a maximum in an intermediate portion (e.g., in the vicinity of 1.3 MHz) of the luminance frequency range, and dropping toward the delay minimum for frequencies thereabove. Such variation of delay with frequency is substantially complementary to the delay distortion present in the luminance signal component developed by detector 30 (as a consequence of the non-linear envelope delay characteristic of IF amplifier 20**).

Curve "a" of FIG. 3 illustrates the amplitude-versus-frequency response characteristic of the schematically illustrated video signal translating stage of FIG. 1 which is obtained when the collector load resistor provided by potentiometer 46 is at the aforesaid maximum resistance value setting. As shown by curve "a," substantial peaking of the high frequency components of the luminance signal is provided at such a resistance value setting. Curve "b" of FIG. 3 illustrates the resultant frequency response characteristic obtained for a midrange resistance value setting (1,000 ohms); for this setting, the peaking effect, while still present, is significantly reduced relative to that associated with curve "a." Curve "c" of FIG. 3 illustrates the resultant frequency response characteristic obtained for a low end resistance value setting (100 ohms); as shown by curve "c," the high frequency component peaking effect is substantially eliminated for this resistance value setting, with response over the highest end of the luminance frequency range dropping below the low frequency response level. With the resistor value setting illustrated by curve "a," the luminance of the image reproduced by the color kinescope is substantially equally responsive to a wide range of luminance component frequencies. With the resistance value setting associated with curve "c," the luminance of the reproduced image is determined by response to a relatively narrow band of luminance component frequencies, with little or no response to the highest luminance frequency components.

FIG. **4*b* illustrates the delay-versus-frequency characteristic for the schematically illustrated video signal translating stage of FIG. 1, when the collector load resistor value is at the midrange setting associated with curve "b" of FIG. 3, while FIG. 4*c* illustrates the delay-versus-frequency characteristic when the collector load resistor has the low end resistance value associated with curve "c" of FIG. 3. Comparison of the characteristics shown in FIGS. 4*a*, 4*b*, and 4*c* reveals that the resistance value changes for the collector load resistor have relatively little effect on the shape of the resultant delay-versus-frequency characteristic. There is a slight change in the frequency location of the delay maximum (i.e., from 1.3 MHz in FIG. 4*a* to 1.4 MHz in FIG. 4*b*, and to 1.55 MHz in FIG. 4*c*); there is also some change in maximum delay magnitude (i.e. from 158 nanoseconds in FIG. 4*a* to 152 nanoseconds in FIG. 4*b*, and to 105 nanoseconds in FIG. 4*c***).

Illustratively, the parameter values for the video signal translating stage are selected so that optimum compensation (i.e., optimum complementing of the delay distortion introduced by the IF amplifier) is obtained at the maximum peaking position. With such choice, the greatest departures from optimum compensation are associated with relatively narrow band image presentations (where departures from ideal compensation will be relatively unnoticeable).

FIG. 2 illustrates schematically a modification of the video signal translating stage of FIG. 1. In the FIG. 2 arrangement, the association of transistor 44 with the emitter load resistor 45 and the variable collector load resistor provided by potentiometer 46 is the same as shown in FIG. 1. The coupling of the collector of transistor 44 to the output terminal O, however, is effected in FIG. 2 by the series combination of capacitor 47 and resistor 49', and the coupling of the emitter of transistor 44 to the output terminal O is effected solely via coil 48. This variation of the FIG. 1 circuit illustrates that the damping of the resonant circuit formed by elements 47, 48 may be effected by a series resistor element (49') in lieu of the shunting resistor approach employed in FIG. 1. An illustrative choice for the series damping resistor value in the FIG. 2 configuration is 2,400 ohms. The damping resistor value choice in either configuration is a major determinant of the maximum delay magnitude.

What is claimed is:

1. A signal translating stage for video signals comprising, in combination:

a phase splitter, having an input responsive to said video signals and a pair of resistive load impedances, for developing oppositely phased versions of said video signals across respective ones of said pair of resistive load impedances;

an output terminal for said signal translating stage;

means, including a first reactive impedance, for coupling signals developed across one of said load impedances to said output terminal;

means, including a second reactive impedance, opposite in reactance sign to said first reactive impedance, for coupling signals developed across the other of said load impedances to said output terminal;

wherein the parameters of said reactive impedances are selected to cause said signal translating stage to exhibit a non-linear delay-versus-frequency characteristic having a desired shape over the range of fequencies occupied by said video signals; and means for varying the amplitude-versus-frequency response characteristic of said signal translating stage without substantial disturbance of the shape of the delay-versus-frequency characteristic thereof, said last-named means comprising means for varying the value of said one resistive load impedance.

VIDEO SIGNAL TRANSLATING CIRCUIT

The present invention relates generally to video signal processing apparatus, and particularly to a novel video signal translating stage of an advantageous form facilitating both delay distortion compensation and amplitude-versus-frequency response control for a video signal channel.

In typical apparatus for reproducing images in response to broadcast television signals, the processing of the received signal information includes amplification at intermediate frequencies in an IF amplifier having a non-linear delay-versus-frequency characteristic. In the absence of compensation for such delay distortion in a color television receiver, for example, luminance signals are subject to differential phase errors which introduce undesired distortions of the reproduced color image. It is accordingly desirable to incorporate some form of delay distortion compensation in the luminance signal channel of a color television receiver.

Another problem faced in the design of color television receivers is the capacitive load presented to video signal drive circuits by the color kinescope employed for image reproduction, which tends to depress response to the higher frequency components of the luminance signal. To compensate for such high frequency response depression, it is desirable to provide some form of "peaking," introducing a compensatory elevation of response to high frequency luminance signal components in a stage of the luminance signal channel preceding the kinescope drivers. However, under certain signal receiving conditions, such as reception of a weak, noisy signal, it is desirable to provide the viewer with a facility for reducing or eliminating the "peaking" effect so as to reduce noise visibility. Accordingly, provision of a viewer-adjustable peaking control is appropriate. In accordance with the principles of the present invention, a video signal translating stage of relatively simple form provides both of the aforementioned delay distortion compensation and adjustable peaking control functions in a manner allowing a response control over a desired range by the peaking adjustments while maintaining the effect of the desired delay distortion compensation.

In accordance with an illustrative embodiment of the invention, video signals are coupled to a base electrode of a transistor having a first load resistor coupled to its collector electrode and a second load resistor coupled to its emitter electrode. A first frequency dependent impedance couples signals developed across said first load resistor to the output terminal of the video signal translating stage; a second frequency dependent impedance, subject to impedance variations with frequency, of a sense opposite to the sense in which the first frequency dependent impedance varies with frequency, couples signals developed across the second load resistor to the output terminal. Variation of the resistance value of one of the load resistors alters the amplitude-versus-frequency response characteristic of the video signal translating stage, while substantially maintaining a non-linear delay-versus-frequency characteristic for the video signal translating stage of a desired compensatory shape. Pursuant to a preferred embodiment, wherein the video signal translating stage is incorporated in the luminance signal channel of a color television receiver, the first frequency dependent impedance comprises a capacitor, and the second frequency dependent impedance comprises an inductor shunted by a resistor, with the parameter values chosen such that the delay-versus-frequency characteristic exhibits a delay maximum in an intermediate portion of the range of frequencies occupied by the luminance signal component. Variation of the impedance value of the collector load resistor serves the adjustable peaking function for the color television receiver.

In the accompanying drawings:

FIG. 2 illustrates schematically a modification of the circuitry of FIG. 1 in accordance with a further embodiment of the invention;

Figure 1:
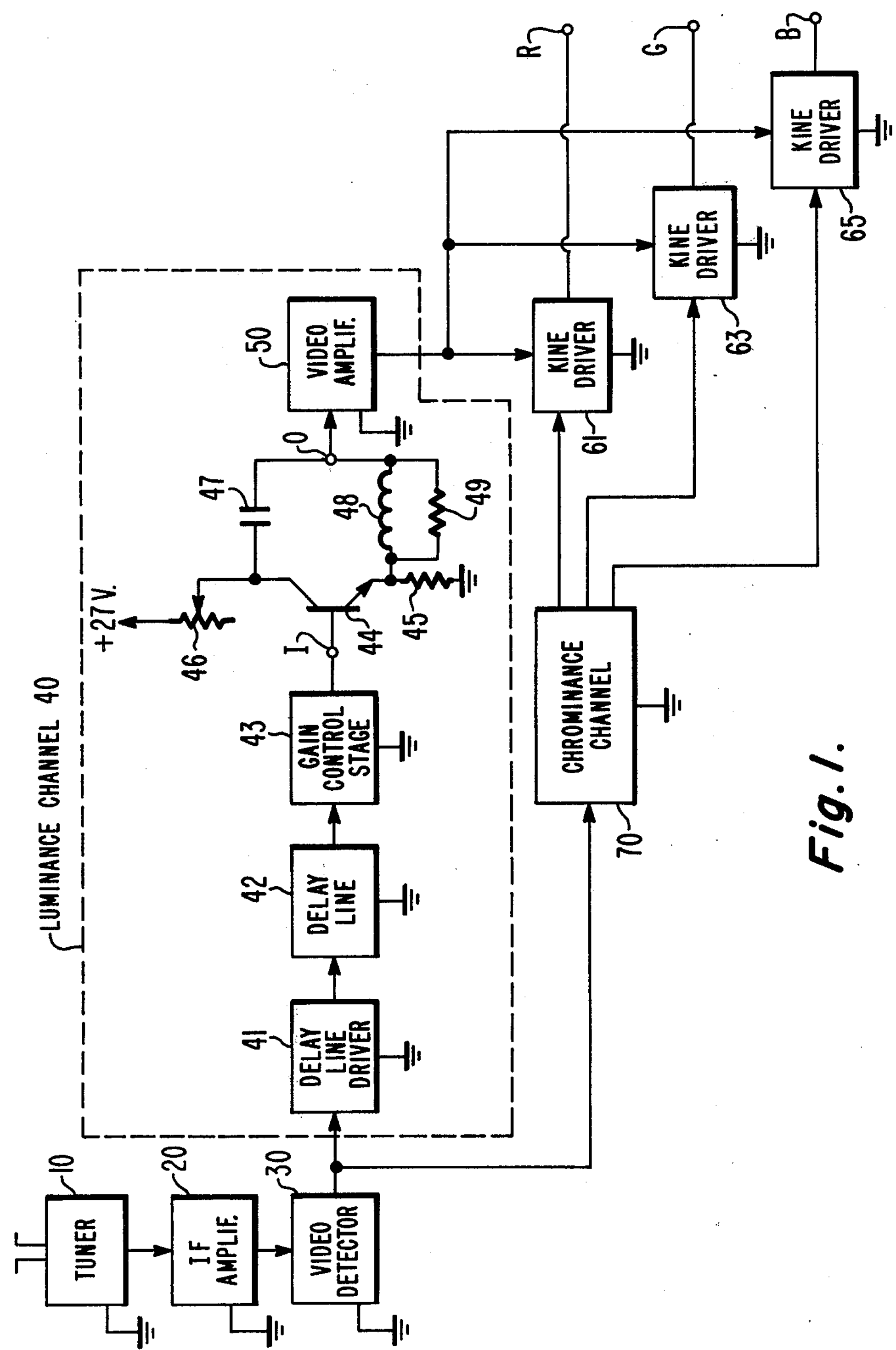
FIG. 1 illustrates, partially schematically and partially by block diagram representation, a color television receiver incorporating a video signal translating stage embodying the principles of the present invention.
Figure 4A:
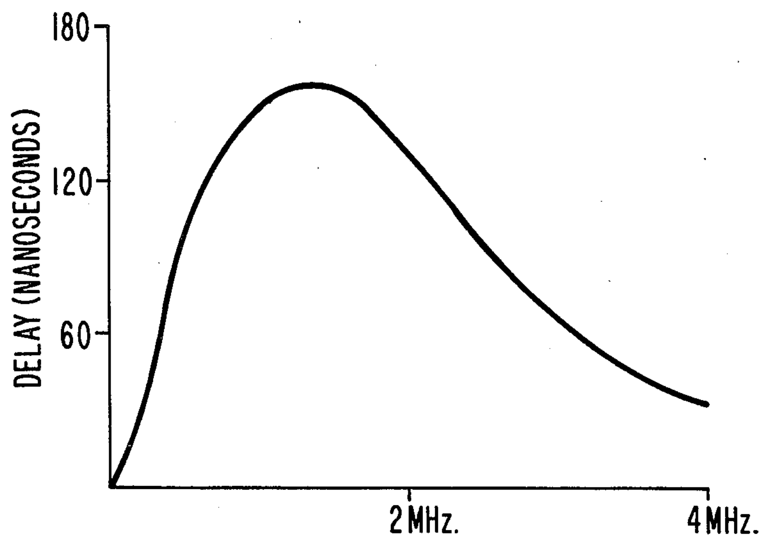
Figure 4B:
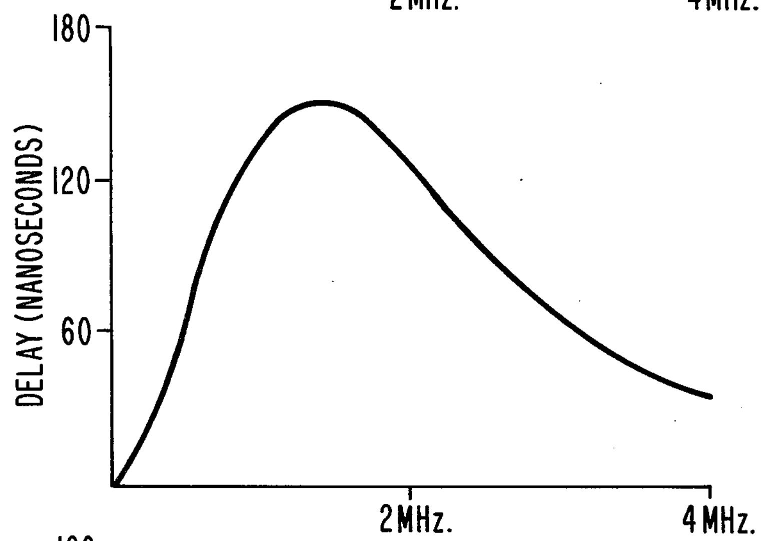
Figure 4C:
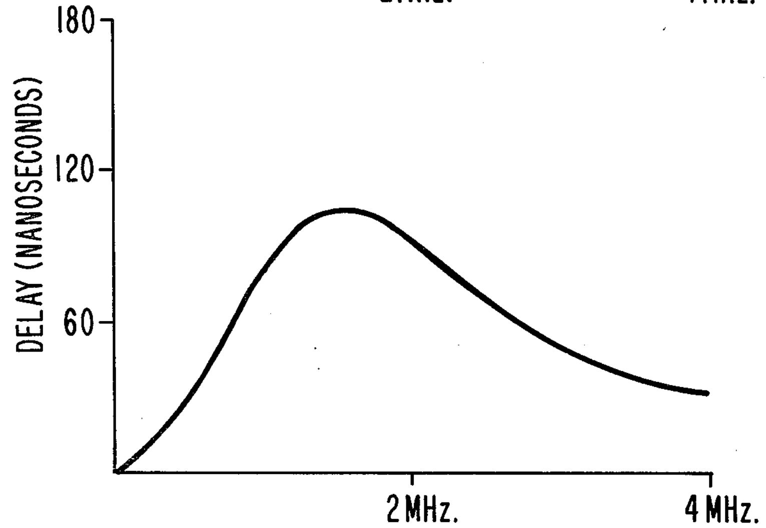

FIGS. 3, **4*a*, 4*b* and 4*c* illustrate graphically response characteristics associated with the operation of the circuitry of FIG. 1**.

In the color television receiver apparatus illustrated in FIG. 1, a tuner 10 provides apparatus for selective reception of a broadcast RF signal and conversion thereof to intermediate frequencies. The output of the tuner 10 is supplied to an IF amplifier 20 which achieves amplification of the received signal at intermediate frequencies. Due to the frequency selective networks conventionally associated with the IF amplifier function, the signals translated by the IF amplifier 20 are subjected to a non-linear delay-versus-frequency characteristic. The output of IF amplifier 20 is supplied to a video detector 30, which demodulates the IF signal to recover a composite color video signal.

The video detector output is supplied to the respective inputs of a luminance channel 40 and the chrominance channel 70. The chrominance channel 70 processes the chrominance component of the composite color video signal to develop therefrom respective color difference signal outputs (of respective R-Y, G-Y and B-Y form). These output signals of the chrominance channel 70 are delivered to respective kinescope driver circuits 61, 63, 65, for matrixing with a luminance signal output of the luminance channel 40, to develop respective red, green and blue color signal outputs at terminals R, G and B for delivery to a color kinescope.

The luminance channel 40 illustratively includes a delay line driver 41, which supplies video signals to a luminance delay line 42, providing a delay of a magnitude appropriate to compensate for the delay suffered by the chrominance component during processing in the chrominance channel 70. The output of delay line 42 is supplied to a gain control stage 43, wherein the video signals are subject to amplification to a variable degree, determined, for example, by the setting of a viewer-adjustable contrast control. The output of gain control stage 43 is supplied to the input terminal I of a schematically illustrated video signal translating stage. The output terminal O of the video signal translating stage is coupled to the input of a video amplifier 50, which supplies the luminance signal input to the kinescope drivers 61, 63, 65. Conventional functions of retrace blanking, DC restoration and brightness control bias adjustment may illustratively be associated with the video amplifier 50.

The schematically illustrated video signal translating stage incorporates a transistor 44 of an NPN type, having its base connected to the input terminal I. A resistor 45 is connected between the emitter of transistor 44 and a point of ground potential. A potentiometer 46 has one fixed end terminal connected to an operating potential 2. Apparatus in accordance with claim 1 wherein said first reactive impedance comprises a capacitor, wherein said second reactive impedance comprises an inductor, and wherein said delay-versus-frequency characteristic exhibits a delay maximum in an intermediate portion of said range of frequencies.

3. Apparatus in accordance with claim 2 wherein said second-named coupling means includes a resistor in parallel with said inductor.

4. Apparatus in accordance with claim 2 wherein said first-named coupling means includes a resistor in series with said capacitor.

5. In a color television receiver wherein the detected output of an intermediate frequency amplifier comprises a composite color video signal inclusive of a luminance signal component subject to delay distortion as a consequence of the non-linear delay-versus-frequency characteristic of said intermediate frequency amplifier; a luminance signal processing channel comprising a video signal translating stage including, in combination:

a transistor having base, emitter, and collector electrodes;

means for coupling signals inclusive of said luminance signal component to said base electrode;

a first load resistor coupled to said collector electrode;

a second load resistor coupled to said emitter electrode;

a video signal translating stage output terminal;

means comprising a first frequency dependent impedance subject to impedance variations with frequency of a first sense, for coupling signals developed across said first load resistor to said output terminal;

means, comprising a second frequency dependent impedance subject to impedance variations with frequency of a second sense opposite to said first sense, for coupling signals developed across said second load resistor to said output terminal; and a peaking control for said luminance signal processing channel comprising means for varying the amplitude-versus-frequency response characteristic of said video signal translating stage, over a range inclusive of (a) a response characteristic exhibiting an appreciably higher amplitude response to high frequency luminance signal components than to low frequency luminance signal components and (b) a response characteristic exhibiting substantially equal amplitude response to high and low frequency luminance signal components, while substantially maintaining a non-linear delay-versus-frequency characteristic for said video signal translating stage of a shape providing substantial compensation for said delay distortion; said last-named means comprising means for varying the resistance value of one of said load resistors.

6. Apparatus in accordance with claim 5 wherein said first frequency dependent impedance comprises a capacitor, wherein said second frequency dependent impedance comprises the parallel combination of an inductor and a resistor, wherein said one load resistor is said first load resistor, and wherein the parameter values for said video signal translating stage are such that said delay-versus-frequency characteristic of said video signal translating stage exhibits a delay maximum in an intermediate portion of the range of frequencies occupied by said luminance signal component.

7. Apparatus in accordance with claim 6 wherein said first frequency dependent impedance comprises the series combination of a capacitor and a resistor, wherein said second frequency dependent impedance comprises an inductor, and wherein said one load resistor is said first load resistor.

8. In a television receiver wherein the detected output of an intermediate frequency amplifier comprises video signals subject to delay distortion as a consequence of the non-linear delay-versus-frequency characteristic of said intermediate frequency amplifier, a video signal translating stage providing both compensation of said delay distortion and adjustable peaking of said video signals; said video signal translating stage comprising:

a transistor having base, emitter and collector electrodes;

means for coupling said video signals to said base electrode;

a first load resistor coupled to said collector electrode;

a second load resistor coupled to said emitter electrode;

a video signal translating stage output terminal;

a capacitor coupled between said collector electrode and said output terminal;

an inductor shunted by a resistor to form a parallel combination, said parallel combination being coupled between said emitter electrode and said output terminal;

wherein the values of said capacitor and the inductor and resistor of said parallel combination are such as to provide said video signal translating stage with a non-linear delay-versus-frequency characteristic exhibiting a delay maximum in an intermediate portion of the range of frequencies occupied by said video signals and providing substantial compensation for the delay distortion introduced by said intermediate frequency amplifier; and wherein said first load resistor comprises a variable resistor providing a facility for varying the amplitude-versus-frequency response characteristic of said video signal translating stage while maintaining the effect of said delay distortion compensation.

* * * * *